United States Patent [19]
Knopf

[11] 3,732,608
[45] May 15, 1973

[54] METHOD OF MAKING A PRECISION POSITIONING APPARATUS

[75] Inventor: George S. Knopf, Dayton, Ohio

[73] Assignee: The Bendix Corporation, Southfield, Mich.

[22] Filed: Feb. 22, 1971

[21] Appl. No.: 117,823

Related U.S. Application Data

[62] Division of Ser. No. 824,243, May 13, 1969, Pat. No. 3,641,535.

[52] U.S. Cl............................29/407, 29/208 C
[51] Int. Cl. .............................................B23q 17/00
[58] Field of Search...........................29/407, 208 C; 340/195-199, 271, 282, 347 PR, 174.1, 195; 318/568, 603; 235/151.1., 151.11; 324/34 PS, 34 O, 34 GT

[56] References Cited

UNITED STATES PATENTS

| | | | |
|---|---|---|---|
| 2,876,650 | 3/1959 | Sangster | 74/365 |
| 3,001,272 | 9/1961 | Picola | 29/407 |
| 3,120,053 | 2/1964 | Lewis | 29/407 |
| 3,262,105 | 7/1966 | Bell | 340/203 |
| 3,308,435 | 3/1967 | Haner et al. | 340/168 |
| 3,312,861 | 4/1967 | Mauch | 317/5 |

Primary Examiner—Charles W. Lanham
Assistant Examiner—V. A. Dipalma
Attorney—Plante, Hartz, Smith & Thompson

[57] ABSTRACT

A positioning apparatus, and method of making same are disclosed, the apparatus including two relatively movable threaded nut and screw members with one of the members having detectable means thereon at intervals about the thread crests and the other having reading head means capable of detecting the detectable means wherein such apparatus is capable of precisely relatively moving its members by relative rotation therebetween and indicating both the magnitude and direction of movement of one member with respect to the other by detection of the detectable means.

In the method of making the apparatus, the reading head means is also capable of being energized to place the detectable means about the thread crest and the method includes the steps of relatively rotating the nut and screw member, measuring intervals of relative axial movement as a result thereof, and energizing the reading head means at such intervals, so that detectable means are placed at positions precisely corresponding to said axial intervals.

7 Claims, 9 Drawing Figures

PATENTED MAY 15 1973
3,732,608
SHEET 1 OF 3

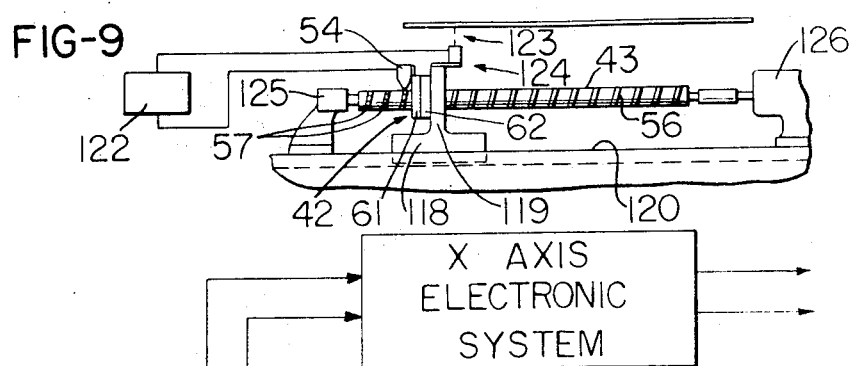
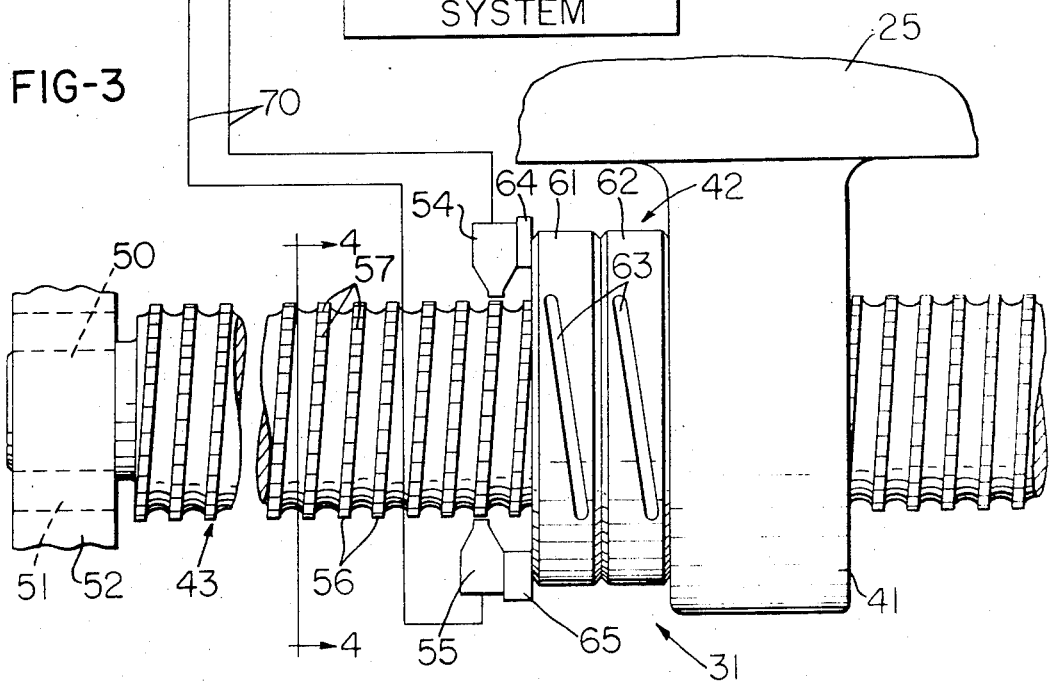
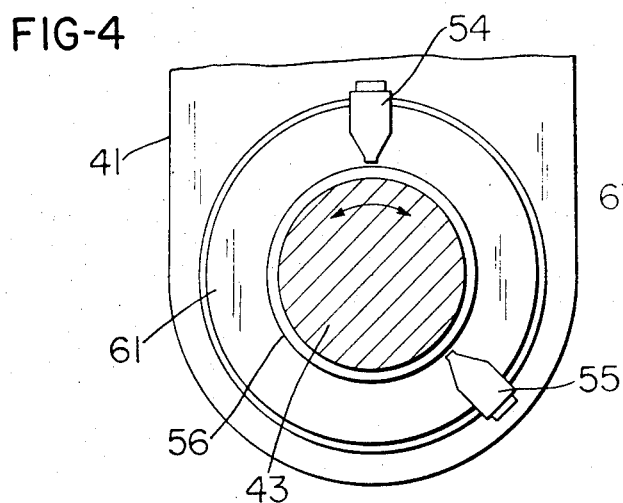
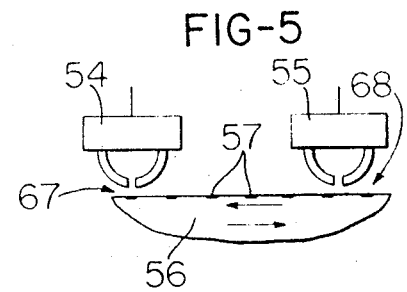

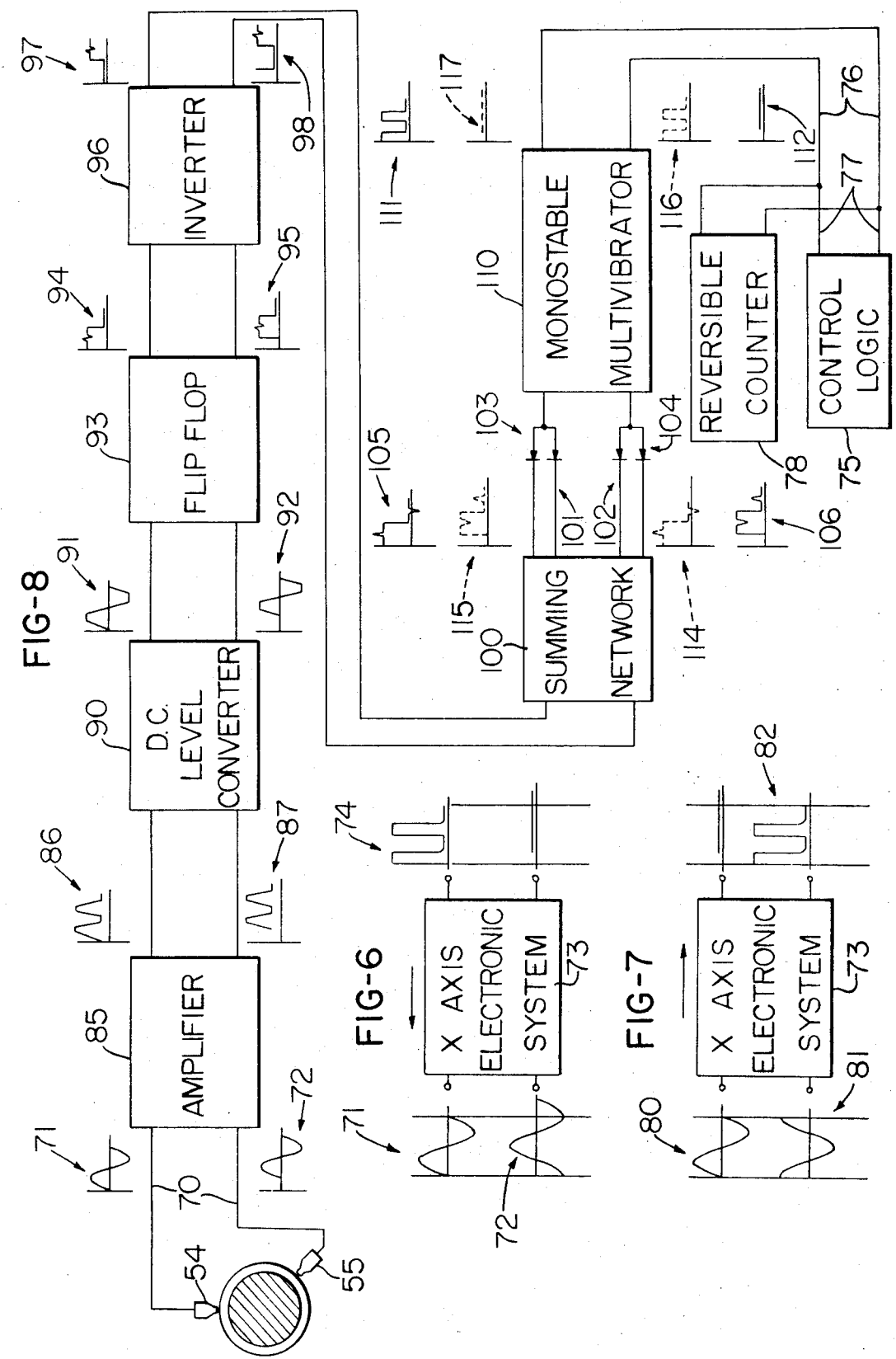

3,732,608

METHOD OF MAKING A PRECISION POSITIONING APPARATUS

CROSS REFERENCE TO RELATED APPLICATION

This application is a divisional patent application of its co-pending parent application, Ser. No. 824,243 filed May 13, 1969, now U.S. Pat. No. 3,641,535, and is assigned to the same assignee to whom the parent application is assigned.

BACKGROUND OF THE INVENTION

Many machines in current use, such as machine tools and measuring machines, for example, have relatively movable components, such as supports or slides which are movable on associated ways; and it is usually necessary to precisely move a particular support as well as indicate both the magnitude and direction of movement of the support with respect to a reference position. In general, present machines use a precision power actuator to move the support along its ways and a separate precision measuring device to precisely indicate the movement of such support for control purposes. This duplication of precision components in a given machine is very expensive and often does not provide optimum machine performance inasmuch as it is difficult to install and maintain such components in the required substantially perfect cooperating relationships, especially after extended use of a particular machine.

SUMMARY

This invention provides a precision positioning apparatus, and method of making same, wherein such apparatus comprises a pair of relatively movable members with one of the members having detectable means thereon and the other having reading head means capable of detecting the detectable means whereby such apparatus serves a dual purpose of precisely relatively moving its members and indicating both the magnitude and direction of movement of one member with respect to the other.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show an exemplary embodiment of this invention, in which

FIG. 3 is an enlarged view of the positioning apparatus for the horizontal slide of the machine of FIG. 2 which is in the form of a threaded screw and a cooperating threaded nut with certain parts in cross section and other parts broken away and also illustrating a pair of reading head means or reading heads comprising such apparatus;

FIG. 4 is a view on the line 4—4 of FIG. 3;

FIG. 5 is a view particularly illustrating the manner in which one of the reading heads is offset from an associated detectable means to enable the reading heads to sense the direction of movement of the nut along its threaded screw;

FIG. 6 is a schematic view showing the nature of the electrical signals as they enter and exit the electrical system during forward movement of the nut and its associated reading heads from a reference position;

FIG. 7 is a view similar to FIG. 6 showing the nature of the electrical signals during reverse movement;

FIG. 8 is a block diagram particularly illustrating the basic components of the electronic system associated with each set of reading heads and utilized to convert the sinusoidal input signals from the reading heads into pulses which may be readily counted by an electronic counting device; and FIG. 9 is a fragmentary view in elevation illustrating an exemplary apparatus which may be used to provide detectable magnetized marks on the threads of a screw comprising the exemplary positioning apparatus of this invention.

DESCRIPTION OF ILLUSTRATED EMBODIMENT

Figure 1:
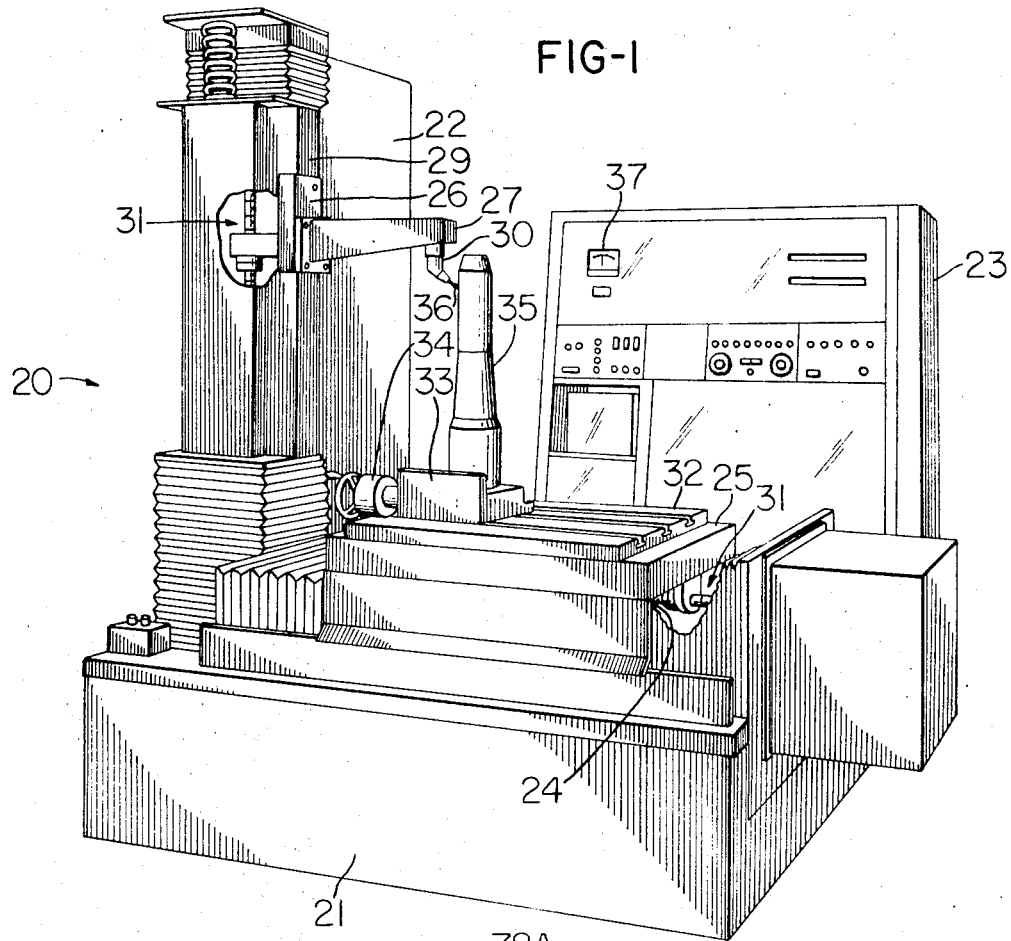
FIG. 1 is a perspective view with parts broken away of an exemplary numerically controlled measuring machine which utilizes one exemplary embodiment of the apparatus of this invention.

Reference is now made to FIG. 1 of the drawings which illustrates an exemplary numerically controlled measuring machine 20 which utilizes one exemplary embodiment of the apparatus of this invention. The measuring machine 20 comprises a base 21 having an upstanding structural portion 22 at one end thereof and an electrical console 23 which houses the electronic controls for the machine and its components. The machine 20 has horizontal ways 24 supported on the base 21 and the ways 24 support a horizontal slide 25 for reciprocating movement. The machine 20 also has vertical ways 29 fixed to the upstanding portion 22 which support a carriage assembly 26 for vertical sliding movement and the carriage assembly carries a substantially horizontally extending arm 27 which has a gaging probe 30 suitably supported adjacent its terminal outer end.

The slide 25 and carriage assembly 26 are each moved along their associated ways by an exemplary precision positioning apparatus of this invention and each apparatus will be designated generally by the reference numeral 31. Only the positioning apparatus 31 comprising the X axis drive system, i.e., used to move the slide 25, will be described in detail and it will be appreciated that such description is also applicable to the apparatus 31 comprising the Y axis drive system and used to move the carriage assembly 26 vertically.

The slide 25 carries a worktable 32 which in turn supports a fixture 33 and the fixture 33 may be initially positioned on the worktable 32 by a manually operated adjustment device 34. The fixture 33 has a workpiece 35 suitably fixed thereto and the workpiece 35 may be precisely horizontally positioned with respect to the gage head 30 by the adjustment device 34 so that a gaging probe 36 comprising the gage head 30 may be brought into gaging association with the workpiece 35 to provide an indication on a visual indicator 37 on the console 23.

Figure 2:
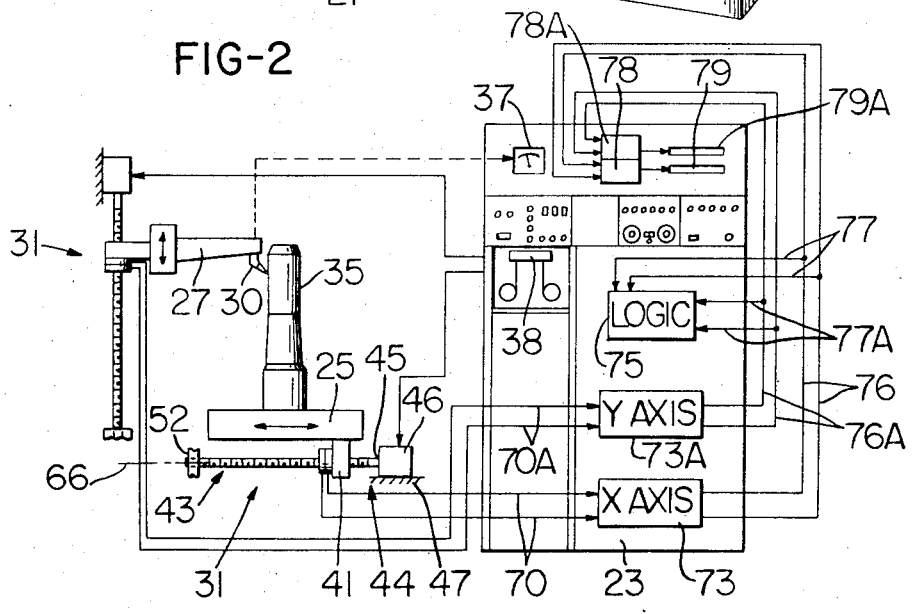
FIG. 2 is a view, with certain parts shown schematically, illustrating the exemplary positioning apparatus of this invention utilized with both a vertically movable and a horizontally movable slide assembly comprising the machine of FIG. 1 and also generally illustrating by block diagrams the basic electrical system associated with each slide assembly.

Once a workpiece 35 has been properly set up on the machine 20 the gaging probe 36 is brought and maintained in gaging association with the workpiece 35 by automatic movement of the carriage assembly 26 and slide 25 which is controlled by tape command from a tape head 38, see FIG. 2. The movement of carriage assembly 26 and slide 25 is achieved utilizing its associated positioning apparatus 31. If desired, the fixture 33 may also have a rotary table as an integral part thereof and after precise positioning of the gaging probe 36 both vertically and horizontally the workpiece 35 may be rotated by such rotary table to provide a measurement of the entire outer periphery of the workpiece 35.

As seen particularly in FIGS. 2 and 3 the movable support or slide 25 has a bracket 41 suitably fixed thereto which enables the slide 25 to be moved by the positioning apparatus 31. The apparatus 31 comprises a driven member 42 which in this example is shown as a threaded nut 42 and a driving member or screw 43 which operatively associates with the nut 42 to move such nut and slide 25 with great precision and in a manner now to be described.

The screw 43 is supported for substantially frictionless rotation with one end 45 thereof arranged at a fixed position shown at 44 on the machine 20. The screw 43 has its end 45 directly coupled to a drive motor 46 which is supported on a fixed support 47 on the machine 20. The opposite end of the screw 43 comprises a plain shaft portion 50 which is received in an antifriction bearing assembly 51 carried by a support 52 which is fixed to a structural portion of the machine 20. The screw 43 is precisely held against axial movement by the motor 46 and cooperating bearing assembly 51 yet is easily rotated either clockwise or counterclockwise by such motor.

The nut 42 is threaded on the screw 43 and fixed to the bracket 41 and such bracket has a comparatively large opening therein so as to allow the screw 43 to pass therethrough in an unobstructed manner. Upon rotating the screw 43 in one direction the net effect is to move the driven nut 42 along the driving screw 43 in a corresponding direction and upon rotating the screw 43 in the opposite direction it will be seen that the nut 42 and slide 25 are moved in a corresponding opposite direction. In this example, the screw 43 is shown provided with conventional left-hand threads and the nut 42 has a cooperating threaded opening extending therethrough whereby clockwise rotation of the screw 43, as viewed looking from the motor 46 toward the gage head 30, results in what will be referred to in this specification as forward movement of the slide 25, i.e., forwardly from motor 46 toward gage head 30; and counterclockwise rotation of the screw 43 results in reverse movement of such slide.

The exemplary threaded screw 43 is comprised of ferrous material and has detectable means thereon, which will be described in more detail subsequently, and the nut 42 has cooperating head means comprised of a pair of reading heads 54 and 55. The reading heads 54 and 55 operatively associate with the detectable means during movement of the nut 42 relative to the screw 43 and precisely determine any relative movement therebetween. In this example of the invention the reference to relative movement refers to the position of the nut 42 as it is threaded along the drive screw 43 and for convenience may be considered as the axial movement of the nut 42 along the screw 43 from its end 45 which coincides with the fixed reference position 44.

The reading heads 54 and 55 operatively associate with the detectable means on the screw 43 and determine not only the magnitude of the movement of the nut 42 and hence slide 25 from the reference position 44 but also the direction of movement of such nut 42 from the reference position 44 in a manner which will be described in detail subsequently together with the exemplary electrical system which operates in association with the reading heads 54 and 55.

The screw 43 may be of conventional construction and comprises a plurality of threads 56 each having a substantially flat crest. Each thread 56 has the previously mentioned detectable means provided thereon and in this example of the invention such detectable means is in the form of a plurality of spaced magnetized marks which for convenience and ease of presentation have been indicated by lines 57, see FIGS. 3 and 5; however, it will be appreciated that such magnetized marks would in reality be magnetized regions or areas which are invisible to the naked eye. The reading heads 54 and 55 are in the form of magnetic reading heads and the magnetized marks 57 are of such a character that they are readily detected by the reading heads 54 and 55.

The driven member or nut 42 is preferably a split nut having a pair of cooperating portions 61 and 62 which are suitably fixed together in a known manner with appropriate spacers or shims so that each portion 61 or 62 is urged against one surface of an associated thread while the other portion is urged against an oppositely arranged surface of an associated thread. With this construction the nut 42 may be moved in both directions along the threaded screw 43 and there will be no lost motion upon reversing the direction of movement. To minimize frictional drag and assure a smooth operation the nut 42 may be in the form of a ball nut, which utilizes recirculating ball bearings which are recirculated in a known manner by external tubes 63, and the nut 42 has its portion 62 suitably fixed to the bracket 41.

The head means 54 and 55 of this example comprise magnetic reading heads; and it will be appreciated that such heads may be of the read-write variety, with each head having a portion capable of applying, i.e., writing the magnetized marks 57 against the crest of each thread 56, as well as reading or detecting such marks 57.

The reading heads 54 and 55 are fastened to supports 64 and 65 respectively and the supports 64 and 65 are attached to nut portion 61 of nut 42. The reading heads may be adjustably fastened on their associated supports 64 and 65 and suitable means are provided on these supports and nut portion 61 to enable supports 64 and 65 to be angularly positioned relative to each other and thereby assure the reading heads are accurately positioned relative to the magnetized marks 57 to provide electrical output signals having a sine-cosine relationship for reasons which will be apparent later in this disclosure. Although the reading heads 54 and 55 of this example are in essence supported by the nut portion 61, it will be appreciated that such reading heads may be supported in any desired manner by the nut 42.

Each thread 56 has a flat crest portion as previously mentioned and the magnetized marks 57 are provided on the flat crest at spaced intervals and arranged so that they may be readily detected by the reading heads 54 and 55. However, the threads 56 may be of any suitable construction and need not necessarily have flat crests, provided that the magnetized marks are provided at locations, preferably adjacent the crest of each thread, where they may be readily detected by the reading heads.

As seen in FIGS. 2 and 3, the actuating portion of the X axis positioning apparatus 31 is defined by the screw 43 and nut 42 which have a common axis 66 which is arranged horizontally and parallel to the motion of the slide 25. Inasmuch as the reading heads 54 and 55 are fixed to the nut 42 and the magnetized marks 57 are provided on the threads 56 of the screw 43, it will be seen that the actuating portion and the position indicating portion of apparatus 31 have a common axis 66. With this arrangement a significant source of error of the type which might otherwise occur in previously proposed devices due to misalignment of the axes of a slide actuator and a position indicating device is avoided.

The reading heads 54 and 55 are positioned with respect to the magnetized marks 57 so that with one of the reading heads positioned directly over a particular mark the other reading head is arranged a predetermined distance between a pair of associated marks. In particular, the reading head 54 of this example of the invention is positioned directly over a mark 57, as indicated at 67, see FIG. 5, while the reading head 55 is positioned approximately ¼ of the distance away from the most closely adjacent mark 57 toward the next mark as indicated at 68.

Each of the reading heads 54 and 55 upon being brought into association with a magnetized mark 57 will produce an output signal which is substantially sinusoidal in form as each head is moved along the screw 54. The placement of the reading heads 54 and 55 in the manner illustrated enables the reading head 54 to provide an output in the form of a sine wave while the displacement of the reading head 55 by roughly 90° as indicated above results in the reading head 55 providing an output in the form of a cosine wave. This sine-cosine wave relationship enables the determination of the direction of movement of the reading heads 54 and 55 from the reference position 44. Further, the electrical circuits which may be utilized in association with the reading heads 54 and 55 to modify the signals detected by each reading head 54 and 55 and convert such signals to useable electrical pulses capable of being counted to determine magnitude and direction of movement will now be described in detail.

The magnetic reading heads 54 and 55 sense the magnetic flux density of the magnetized marks 57 and produce an electrical output signal which is proportional to the magnitude, i.e., strength, of such density. The reading heads 54 and 55 may be flux bridge devices of known construction which detect flux unbalance even though there is no relative movement between the threaded screw 43 and nut 42 whereby the heads 54 and 55 do not require movement or a breaking of the magnetic lines of force in order to provide an output signal therefrom. Because the heads 54 and 55 are of known construction a more detailed description of their construction and operation is considered unnecessary. It will also be appreciated that the magnetic heads 54 and 55 may be of the type which require external excitation, which may be provided in any manner which is well known in the art, to assure that with the nut 42 and screw 43 in a stationary position useable output signals will be provided from the heads 54 and 55. The signals from the heads 54 and 55 are provided to an associated X axis electronic circuit through lines 70.

Reference is now made to FIGS. 2 and 6 of the drawings, wherein it will be seen that the arrangement of the reading heads 54 and 55 is such that with movement of the nut 42 and slide 25 in a forward direction, i.e., forwardly from fixed reference position 44 toward the gage head 30, the sinusoidal signal indicated at 71 from the gage head 54 leads the signal indicated at 72 from the gage head 55 by approximately 90° and enters the X axis electronic circuit shown by a block diagram and designated by the reference numeral 73. The sinusoidal signals are modified and rendered useable by the electronic circuit or system 73 so that for forward movement sharply defined useable pulses are provided which have the form illustrated at 74 in FIG. 6. The pulses 74 are fed to a logic network 75 through lines 76 and 77, see FIG. 2, where they are compared with command signals from the machine input circuit which in this example of the invention comprises an input from the tape head 38. If desired, an output may also be provided from the control logic network to a feedback system (not shown) and the output may be utilized in a known manner to energize the motor 46 and reposition the slide 25 as a function of the command signal from the feedback system. The output pulses of the type indicated at 74 may also be provided through lines 76 to a reversible electronic counter 78 which is operatively connected to a visual indicating device 79 which may indicate the exact position of the slide 25 with respect to the reference position 44, for example, by displaying a corresponding dimensional measurement.

With reverse movement of slide 25 the sinusoidal signal indicated at 80, see FIG. 7, from the gage head 54 lags the signal indicated at 81 from the gage head 55 by approximately 90 degrees as it enters the X axis electronic circuit 73 where it is modified and rendered useable. For reverse movement sharply defined useable pulses are provided which have the form illustrated at 82. The pulses for reverse movement are also fed to logic network 75 through lines 76 and 77 and to the reversible counter 78 through lines 76.

As previously stated, the detailed description is being made for the positioning apparatus 31 and electronic circuitry associated with the dual-purpose drive and position indicating system for the horizontal slide 25; however, it will be appreciated that substantially identical components are used with the positioning apparatus 31 associated with the vertically movable carriage assembly 26. Accordingly the Y axis electronic system is also presented as a block diagram and designated by the reference numeral 73 followed by the letter designation A and will not be described in detail. Similarly the electrical lines from heads 54 and 55 associated with the Y axis apparatus 31 to the Y axis electronic system and the other electrical components with connecting lines for the Y axis system will also be designated by the same reference numerals as corresponding members of the X axis system and each of such members will also have its reference numeral followed by the letter designation A and not described again.

Reference is now made to FIG. 8 of the drawings for a more detailed presentation of the component portions of the X axis electronic system which is associated with the positioning apparatus 31 for the horizontal slide 25. The presentation in FIG. 8 has been made using block diagrams and the wave forms of the electrical signals exiting each major component of the system have also been illustrated for ease of understanding. The detailed electrical parts comprising each major component shown in FIG. 8 may be of any suitable known construction and hence the presentation is considered fully adequate to enable one skilled in the art to provide an operating system from the information presented.

Also, for ease of presentation different reference numerals have been used to indicate the different wave forms of the signals exiting each major component and each reference numeral may be used interchangeably to refer to either the waveform or the electrical signal. The wave forms of the signals are presented by solid lines and are for forward movement of the slide 25. A few signals have been presented by dotted lines and the dotted wave forms are for reverse movement of the slide.

The signal from the magnetic reading head 54 is indicated at 71 and is shown leading, by 90 degrees, the signal from the reading head 55 indicated at 72. The signals are amplified in an amplifier 85 and the amplified signals from the reading heads 54 and 55 have wave forms as illustrated at 86 and 87 respectively. The signals from the amplifier 85 are supplied to a DC level converter 90 so that the wave forms 86 and 87 are converted to amplified wave forms as shown at 91 and 92 respectively.

The signals indicated at 91 and 92 are then fed to a multivibrator or flip-flop 93. The flip-flop 93 is in essence a squaring device used to obtain square waves from the roughly sinusoidal signals from the DC level converter 90 whereby the signals exiting the flip-flop 93 have wave forms as illustrated at 94 and 95. The signals 94 and 95 are supplied to an inverter 96 which provides a pair of counter phase signals having wave forms 97 and 98 respectively.

The signals 97 and 98 are then supplied to a summing network 100 which is comprised of two identical channels 101 and 102 with channel 101 having only the forward count pulses exiting therefrom and channel 102 having only the reverse count pulses exiting therefrom. Each channel 101 and 102 has sets of diodes 103 and 104 associating respectively therewith and each set of diodes allows only a negative signal to pass therethrough.

The wave forms of the signals from the summing network 101 during forward movement of the slide 25 are shown at 105 and 106 with the signal from the reading head 54 leading. The signals 105 and 106, during forward movement, are supplied to a monostable multivibrator 110 so that the signals exiting the multivibrator 110 have wave forms as indicated at 111 and 112 whereby the signal 112 is not useable and the signal 11 is a distinct useable signal which may be supplied to the control logic network 75 and to the counter 78 (as forward count pulses) utilizing an associated one of the lines 76.

During reverse movement of the slide 25 the signal through the reverse channel 102 will be such that once the modified signal from the reading head 55 exits the summing network 100 it has a wave form as indicated at 114 while the modified signal from reading head 54 has a wave form as indicated at 115. The signals 114 and 115, during reverse movement, are supplied to the multivibrator 110 so that the signals exiting such multivibrator have wave forms as indicated at 116 and 117 respectively whereby the signal 117 is not useable and the signal 116 is a distinct useable signal which may be supplied to the control logic network 75 and to the counter 78 (as reverse count pulses) using the other of the lines 76.

Thus, the diodes at 103 and 104 operate to block passage of any positive voltages and allow only negative voltages, i.e., signals, to pass through to the monostable multivibrator 110 arranged downstream thereof. Further, during forward movement of the slide 25 only forward pulses 111 exit the multivibrator 110 and during reverse movement only reverse pulses 116 exit multivibrator 110.

Thus, it is seen that the apparatus 31 of this invention provides a power actuating device capable of precisely moving an associated member thereof such as nut 42, with slide 25 fixed thereto, along a precision screw 43 and the apparatus 31 has an electrical circuit capable of precisely determining both the magnitude and direction of movement of the slide 25 with respect to a reference position 44 by providing associated reading heads which have sinusoidal outputs and a sine-cosine relationship.

The nut 42 and screw 43 may be of any suitable conventional construction as previously mentioned and may be made on conventional machines. Further, manufacturing costs can be kept at a minimum, while still providing a precision apparatus, because of the unique apparatus and method used to apply detectable means such as magnetized marks on the screw 43.

Following the manufacture of the screw 43 and the nut 42 these members may be suitably operatively associated by threading the nut along the screw 43 and the nut 42 may be suitably preloaded by relatively moving its portions 61 and 62 and fixing such portions in position to eliminate any backlash due to reversing the rotation of the nut 42 along the screw 43. The assembled screw 43 and nut 42 may then be placed in position on an associated fixture 118, see FIG. 9.

In particular the nut 42 may be fixed to a slide 119 which is supported for precise rectilinear movement along horizontal ways 120. A suitable head means, shown as head 54 in this example inasmuch as such head is a read-write head, is attached firmly to the nut 42 and positioned so that it will place detectable means in the form of magnetized marks 57 on the periphery of the screw 43 upon command from an associated control 122. The nut 42 is placed in threaded engagement at one end of the screw 43 and an independent measuring device 123 is placed in operative association with the nut 42 as shown at 124.

The screw 43 is supported by a bearing assembly 125 at one end and by a directly coupled motor 126 at its other end whereby it is confined against axial movement. The screw 43 is rotated by the motor 126 causing axial movement of the nut 42 therealong and at predetermined axial positions of the nut 42 along the screw 43, as determined by the measuring device 123, the control 122 is energized causing it to energize the head 54 and place a corresponding magnetic mark 57 on that portion of an associated thread 56 aligned beneath the head 54.

Following the complete traverse of the nut 42 from one end of the screw 43 to the other a complete spiral track of magnetized marks 57 will be provided on the screw 43 and the pulses may be precisely spaced so that the separation between each immediately adjacent pair of magnetized marks will be equivalent to a fixed linear movement of the nut 42 along the axis of the screw 43. This technique may result in a non-uniform placement of magnetized parks 57 on the periphery of the screw but would clearly result in a proper spacing of the magnetized marks if considered only relative to motion in an axial direction.

Should the screw and nut combination be subsequently tested and it is found that the placement of magnetized marks 57 does not provide the desired accuracy, these marks could be easily magnetically erased, in this example, and the lead screw 43 returned to the associated calibration fixture 118 and a new set of magnetized marks recorded thereon.

In this example of the invention the long range measuring device 123 is shown schematically as an optical grating system which uses reflective gratings including an elongated fixed scale grating; a movable comparatively short index grating; and the required associated components including a light source, photoelectric cells, collimating lens, etc. Because such a measuring device is well known in the art it will not be described in more detail. It will also be appreciated that other suitable long range measuring devices may be used with the fixture 118, such as a laser interferometer, for example.

In some applications of this invention it may be preferred to mount the screw 43 and nut 42 in position on an associated machine such as the machine 20. A separate measuring device, such as the device 123, may then be installed in position and operatively associated with one end of the nut 42 so that upon rotating the screw 43 the nut is moved axially along such screw and magnetized marks 57 may be placed on the screw 43 using the read-write head 54 for example. With this technique any errors made in manufacturing a particular combination of screw and nut are automatically compensated for. In addition, errors made in installing the screw and nut and associated components on a particular machine are also compensated for.

The long track defined by the spiral path of the threads on the screw 43 provides a comparatively long linear track on which to apply magnetized marks for a given axial distance that the nut 42 travels along the screw 43. This obviously reduces the accuracy with which the magnetized marks must be placed on the screw 43 and thereby increases the overall accuracy of the system. Also, if the state of the art limits grating lines of an optical system to a thousand lines per inch the overall system accuracy is limited accordingly. However, by using a screw 43 having a 3-inch diameter, for example, and four threads per inch, approximately 40 thousand lines could be recorded per inch of axial movement. Obviously, this offers substantial improvement over resolutions offered by currently available devices similar in function to the apparatus 31.

The above description may suggest that the application of magnetized marks requires intermittent movement of the nut 42 along the screw 43 and the placement of a magnetized mark by the writing head portion of the head 54 on the screw 43 while the head is stopped. However, it will be appreciated that the screw 43 may be continuously rotated thereby moving the nut 42 therealong whereby magnetized marks 57 could be readily applied during continuous movement of the nut 42 along the screw 43.

In this example of the invention the reading heads 54 and 55 are shown as magnetic reading heads and the detectable means are shown as magnetized marks 57. However, it will be appreciated that the concept of providing a power actuator and a position indicator as one integral unit may be utilized not only where the detectable means comprises magnetic marks 57 and the heads comprise magnetic reading heads similar to 54 and 55 but also where the marks may be purely mechanical and defined as scribed lines or photographic lines generated by a light beam impinging on a photographic emulsion on the lead screw, for example. Likewise the associated reading heads may be electrooptical reading heads which provide sinusoidal output signals similar to the signals described in detail in connection with the magnetic reading heads 54 and 55.

In this example of the invention only a pair of reading heads 54 and 55 have been illustrated; however, it will be appreciated that each reading head 54 and 55 may be of the type which operatively associates with a plurality of magnetized marks 57 and emits an average sinusoidal output signal therefrom which may be amplified and placed in suitable form for further use in a similar manner as previously described. In addition, the reading heads 54 and 55 instead of being spaced from the screw 43 as shown may, if desired, be of the type which slidably contact such screw during movement of the nut 42 therealong.

In utilizing a a positioning apparatus which employs a magnetic system it is also entirely within the scope of this invention to provide magnetized marks 57 on the screw 43, each having clearly discernible north and south poles whereby a single reading head may be utilized to detect not only the magnitude of movement of a nut 42 from a reference position 44 but also the direction of such movement from the reference position.

The actuating system of this example is shown as being defined by a threaded screw 43 and a cooperating ball nut 42. However, it will be appreciated that the concept of this invention is fully applicable to other types of actuators whether they be linear actuators, rotary actuators, or combinations of such, and such actuators may be powered by mechanical, electrical, or fluid means. However, regardless of its type each particular actuator enables precision power actuation as well as precision indication of position from a reference position. In addition, any suitable electronic means may be provided to reset the reference or zero position to any point along the screw 43 and provide a precision indication of position in either direction from such point.

Each magnetized mark 57 has been described as producing a signal which is picked up by an associated reading head and subsequently utilized in the manner described above. However, it will be appreciated that though known electronic techniques means may be provided for producing signals intermediate each immediately adjacent pair of magnetized marks 57 to thereby provide interpolation between marks and hence a more precise indication of position.

While present exemplary embodiments of this invention, and methods of practicing the same, have been illustrated and described, it will be recognized that this invention may be otherwise variously embodied and practiced by those skilled in the art.

What is claimed is:

1. A method of making a precision positioning apparatus having integral means for determining relative movement between a driven member and a driving member comprising said apparatus, said method comprising the steps of, operatively associating said driving member and said driven member to enable movement of said driven member, attaching head means on one of said members, said head means being capable of placing detectable means on the other of said members, operating said driving member to move said driven member predetermined precise increments as determined by independent measuring means associating with said driven member, and placing detectable means on said other member by energizing said head means after each precise increment of movement of said driven member, said detectable means being placed so that the spacing between any pair of selected detectable means represents a known precise dimension which may be subsequently detected by a reading head and utilized to provide a precise determination of said relative movement.

2. A method as set forth in claim 1 in which said attaching step comprises attaching said head means on said driven member to enable placing said detectable means on said driving member which may detected by said reading head carried by said driven member.

3. A method as set forth in claim 2 and comprising the further step of erasing said detectable means to enable reapplication thereof for any desired purpose.

4. A method as set forth in claim 2 in which said driving member comprises a drive screw, said driven member comprises a cooperating nut, said step of operatively associating said members comprises threading said nut on one end of said screw, and said placing step comprises the further steps of holding said nut against rotation while allowing rectilinear movement thereof along said screw and rotating said screw with its opposite ends held at fixed positions to thereby move said nut through said precise increments of movement in the form of axial increments along said screw, whereby the total length of the spiral path defined by the threads of said screw provides a track of maximum length on which to apply a detectable means.

5. A method as set forth in claim 2 in which said attaching step comprises attaching head means in the form of a read-write head which has a portion capable of placing said detectable means on said driving member and another portion defining said reading head.

6. A method as set forth in claim 2 in which said attaching step comprises attaching said head means having a magnetic writing head and said energizing step comprises energizing said magnetic writing head to place said detectable means in the form of magnetized marks on said driving member.

7. A method as set forth in claim 2 and comprising the initial steps of supporting said driving member with one end thereof coinciding with a fixed reference position of a machine, supporting said driven member on a movable support of said machine while allowing said operative association of members in an unobstructed manner so that said detectable means may be placed on said driving member with said members installed on their associated machine, whereby inherent errors made in manufacturing and assembling said members and their associated components are automatically compensated for during the application of said detectable means.

* * * * *